United States Patent
Fairbanks et al.

(10) Patent No.: US 10,966,060 B2
(45) Date of Patent: *Mar. 30, 2021

(54) SYSTEMS AND METHODS FOR DETERMINING A LOCATION OF AN ELECTRONIC DEVICE USING BILATERATION

(71) Applicant: Kenmar Corporation, Southfield, MI (US)

(72) Inventors: Neal C. Fairbanks, Livonia, MI (US); Frederick R. Nader, Bloomfield Hills, MI (US); Collin M. Rusk, Birmingham, MI (US)

(73) Assignee: Kenmar Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,436

(22) Filed: Jul. 21, 2020

(65) Prior Publication Data

US 2020/0351622 A1 Nov. 5, 2020

Related U.S. Application Data

(63) Continuation of application No. 16/000,530, filed on Jun. 5, 2018, now Pat. No. 10,743,141.

(51) Int. Cl.
*H04W 4/029* (2018.01)
*H04B 17/318* (2015.01)
(Continued)

(52) U.S. Cl.
CPC ......... *H04W 4/029* (2018.02); *H04B 17/318* (2015.01); *H04W 4/027* (2013.01); *H04W 4/40* (2018.02); *H04W 4/80* (2018.02)

(58) Field of Classification Search
CPC ......... H04W 4/029; H04W 4/80; H04W 4/40; H04W 4/027; H04B 17/318
See application file for complete search history.

(56) References Cited

U.S. PATENT DOCUMENTS

| | | | |
|---|---|---|---|
| 3,996,590 | A | 12/1976 | Hammack |
| 5,454,720 | A | 10/1995 | FitzGerald et al. |
| (Continued) | | | |

FOREIGN PATENT DOCUMENTS

EP    2110684 A3    7/2012

OTHER PUBLICATIONS

Ahmed, Shereen A.M. et al., "Overview of Wireless Access in Vehicular Environment (WAVE) Protocols and Standards", Indian Journal of Science and Technology, vol. 6, Jul. 2013; 8 pages.
(Continued)

*Primary Examiner* — Mussa A Shaawat
(74) *Attorney, Agent, or Firm* — Howard & Howard Attorneys PLLC

(57) ABSTRACT

A method of determining a location, using bilateration, of an electronic device that is spaced from transmitting devices is disclosed. The electronic device receives first and second signals of the same or different signal type from first and second transmitting devices, respectively, with an antenna. The electronic device determines a signal quality of each signal based on: 1) a received signal strength indicator (RSSI) or a received signal power and a received signal gain, and 2) signal propagation characteristics specific for the transmitting devices. The signals with the two highest signal qualities are used for location determination. The distance from the transmitting devices can be determined based on one or more of: a received signal power and signal gain for both signals, a transmitted power and signal gain of both signals, or location information associated with the trans-
(Continued)

mitting devices. The method determines two points of intersection based on the distance, determine which intersection is reliable, generates new coordinates for the electronic device.

20 Claims, 14 Drawing Sheets

(51) Int. Cl.
*H04W 4/02* (2018.01)
*H04W 4/40* (2018.01)
*H04W 4/80* (2018.01)

(56) References Cited

U.S. PATENT DOCUMENTS

| | | | |
|---|---|---|---|
| 6,175,723 B1 | 1/2001 | Rothwell, III | |
| 6,263,268 B1 | 7/2001 | Nathanson | |
| 6,300,904 B1* | 10/2001 | Dvorak | G01S 5/12 342/457 |
| 6,407,703 B1 | 6/2002 | Minter et al. | |
| 6,414,635 B1 | 7/2002 | Stewart et al. | |
| 6,819,286 B2 | 11/2004 | Armbruster et al. | |
| 6,865,395 B2 | 3/2005 | Riley | |
| 6,950,629 B2 | 9/2005 | Nagy | |
| 7,190,325 B2 | 3/2007 | Nagy | |
| 7,539,456 B2 | 5/2009 | Harles et al. | |
| 7,593,999 B2 | 9/2009 | Nathanson | |
| 7,649,490 B2 | 1/2010 | Park et al. | |
| 7,800,541 B2* | 9/2010 | Moshfeghi | G01C 21/20 342/465 |
| 8,014,791 B2 | 9/2011 | Guigne et al. | |
| 8,072,382 B2* | 12/2011 | Smith | G01S 13/93 342/387 |
| 8,213,389 B2 | 7/2012 | Bush et al. | |
| 8,280,617 B2 | 10/2012 | Young et al. | |
| 8,355,737 B2* | 1/2013 | MacNaughtan | G01S 5/0252 455/456.1 |
| 8,560,609 B2 | 10/2013 | Nathanson | |
| 8,630,656 B2 | 1/2014 | Rowe et al. | |
| 8,792,908 B2 | 7/2014 | Youssef et al. | |
| 8,903,324 B1 | 12/2014 | Bradley | |
| 8,933,776 B2* | 1/2015 | Dua | G01S 13/91 340/5.2 |
| 9,344,846 B2 | 5/2016 | Mondal et al. | |
| 9,354,310 B2 | 5/2016 | Visser et al. | |
| 9,503,968 B2 | 11/2016 | Nathanson et al. | |
| 9,661,473 B1 | 5/2017 | Jarvis et al. | |
| 9,693,197 B2 | 6/2017 | Varoglu et al. | |
| 10,524,225 B1 | 12/2019 | Boross et al. | |
| 2002/0180640 A1 | 12/2002 | Gilkes et al. | |
| 2003/0006935 A1* | 1/2003 | Bay | G01S 13/878 342/465 |
| 2003/0096620 A1* | 5/2003 | Ozturk | H04W 64/00 455/456.1 |
| 2003/0176196 A1* | 9/2003 | Hall | G01S 5/0205 455/456.1 |
| 2004/0169603 A1* | 9/2004 | Armbruster | G01S 5/0226 342/463 |
| 2004/0185873 A1* | 9/2004 | Gilkes | H04W 64/00 455/456.2 |
| 2004/0248589 A1 | 12/2004 | Gwon et al. | |
| 2005/0282556 A1 | 12/2005 | Morris | |
| 2007/0156311 A1 | 7/2007 | Elcock et al. | |
| 2007/0213922 A1* | 9/2007 | Van Buer | H04W 4/44 701/117 |
| 2010/0110948 A1 | 5/2010 | Batta | |
| 2011/0051658 A1* | 3/2011 | Jin | H04L 67/18 370/328 |
| 2011/0231546 A1 | 9/2011 | Nathanson | |
| 2012/0115508 A1 | 5/2012 | Moeglein et al. | |
| 2012/0309410 A1 | 12/2012 | Marti et al. | |
| 2012/0329484 A1 | 12/2012 | Rothschild | |
| 2013/0102324 A1 | 4/2013 | Qie et al. | |
| 2013/0279488 A1* | 10/2013 | Singh | H04W 4/80 370/338 |
| 2014/0064126 A1 | 3/2014 | Lim et al. | |
| 2014/0195102 A1* | 7/2014 | Nathanson | H04W 48/16 701/31.4 |
| 2015/0264536 A1 | 9/2015 | Patil et al. | |
| 2015/0319681 A1 | 11/2015 | Nathanson et al. | |
| 2015/0354970 A1* | 12/2015 | Friedler | G01S 5/0252 455/456.1 |
| 2016/0165405 A1* | 6/2016 | Shinozuka | A61B 5/6804 455/456.1 |
| 2016/0165570 A1 | 6/2016 | Kim et al. | |
| 2016/0231426 A1* | 8/2016 | Smith | G01S 17/86 |
| 2016/0295376 A1* | 10/2016 | Geng | H04W 4/33 |
| 2016/0327629 A1* | 11/2016 | Pandharipande | G01S 5/0236 |
| 2016/0327632 A1 | 11/2016 | Moshfeghi | |
| 2017/0140637 A1* | 5/2017 | Thurlow | G08B 25/10 |
| 2017/0245198 A1 | 8/2017 | Kim et al. | |
| 2019/0182790 A1* | 6/2019 | Kothari | G01S 5/0252 |
| 2019/0200320 A1* | 6/2019 | Selvaganapathy | H04W 74/0833 |

OTHER PUBLICATIONS

Bardwell, Joe, "Converting Signal Strength Percentage to dBm Values", WildPackets, Inc., Nov. 2002; 12 pages.
Hartenstein, Hannes et al., "A Tutorial Survey on Vehicular Ad Hoc Networks", Topics in Ad Hoc and Sensor Networks, IEEE Communications Magazine, Jun. 2008; pp. 164-171.
Karagiannis, Georgios et al., "Vehicular Networking: A Survey and Tutorial on Requirements, Architectures, Challenges, Standards and Solutions", IEEE Communications Surveys & Tutorials, 2011; 37 pages.
Morgan, Yasser L., "Managing DSRC and WAVE Standards Operations in a V2V Scenario", International Journal of Vehicular Technology, vol. 2010; 15 pages.
Özdemir, Tayfun, "Frequency Tunable Antenna for LTE(4G) Handsets Operating in the 2.3-2.7GHx Global Roaming Band", Monarch Antenna, Inc., Antenna Systems 2015; 25 pages.
Özdemir, Tayfun, "Self-Structuring Antenna", Monarch Antenna, Inc.; 15 pages.
Özdemir, Tayfun et al., "Frequency Tunable Antenna for LTE (4G) Handsets Operating in the 2.3-2.7GHz Global Roaming Band", Antennas and Propogationg & USNC/URSI National Radio Science Meeting, 2015 IEEE International Symposium; 2 pages.
Özdemir, Tafun, "Polarization Diversity Cognitive Antenna for WiFi and ZigBee Applications", Wireless and Microwave Technology Conference, 2009; 3 pages.
Özdemir, Tayfun, "A Polarization Diversity Multi-Beam Antenna for ZigBee Applications", Monarch Antenna, Inc.; 4 pages.
Özdemir, Tayfun et al., "Smart antenna technology for structural health monitoring applications", Nondestructive Characterization for Composite Materials, Aerospace Engineering, Civil Infrastructure, and Homeland Security 2010; 7 pages.

* cited by examiner

SYSTEMS AND METHODS FOR DETERMINING A LOCATION OF AN ELECTRONIC DEVICE USING BILATERATION

CROSS REFERENCE TO RELATED APPLICATIONS

This is a continuation application of U.S. application Ser. No. 16/000,530 filed on Jun. 5, 2018.

BACKGROUND

1. Field of the Invention

The subject invention relates to a method for determining a location of an electronic device using bilateration.

2. Description of Related Art

As electronic devices, such as computers and cell phones, have become more prevalent, there is a growing desire to determine the location for such devices for a variety of applications. One of the most prevalent consumer applications has been in travel. The electronic device may reside in an unknown location, and it may be desirable to determine the location of the device. One common approach is to use a Global Positioning System ("GPS") to determine location. GPS systems incorporate navigation systems which help the user find their desired destinations. Many of the systems provide navigation with visual and audio cues that aid the user in navigating through streets and highways which may be unfamiliar to the user.

However, GPS systems require line-of-sight signals from GPS satellites, so in cities, the presence of tall buildings can make it difficult to receive an accurate GPS signal. Tall buildings create what is referred to as an urban canyon environment. The presence of buildings and landscaping can block the open sky from view by a GPS receiver. Reflections can also degrade GPS signals by causing multipath interference. As a result, GPS location information can be slow or impossible to obtain. Further, in situations such as those involving roads with branches, GPS systems in vehicles can have difficulties in accurately determining which branch of the road a vehicle is located on. As a result, commercially available GPS solutions may not provide sufficient resolution to determine when a vehicle has exited a freeway. In large cities such as San Francisco, New York, and Chicago, there are many locations in which GPS signals do not operate or may not provide sufficiently consistent location data for navigation. For example, if a user takes the subway around the city, the current GPS systems may not be able to determine any locations within the tunnels, and this may lead a user to exit the train at the wrong train station. Also, many destinations in a large metropolitan city may require a vertical coordinate as well as a longitudinal and latitudinal coordinate. For example, a store within a mall may be located on the top level of a building.

To address the problems associated with using GPS signals to ascertain a user's location in an urban canyon environment, some electronic devices rely on triangulation from signals of nearby cellular telephone towers or information about nearby Wi-Fi hotspots. However, such known systems require at least three signals and can consume additional time if many signals are present. Further, the known methodologies do not provide sufficiently consistent and accurate location data for the electronic device. This is most prevalent in the urban canyon environment when the location is displayed on a mapping program and the location skips or jumps about the map as different signals are received.

SUMMARY

A method for determining a location of an electronic device using bilateration is disclosed. The electronic device has an antenna connected thereto. The method comprises the steps of receiving a plurality of signals emitted from transmitting devices within a vicinity of the electronic device with the antenna and determining a signal quality for the plurality of signals that are received based on 1) a received signal strength indicator or 2) a received signal power and a received signal gain, and signal propagation characteristics based on transmitting device information that comprises manufacturer and type of transmitting device for each of the plurality of transmitting devices. Next, the signal propagation characteristics are compared with either 1) the received signal strength indicator or the received signal power and 2) the received signal gain and at least two of the plurality of signals with the highest signal quality are designated for location determination. The method determines a distance from the transmitting devices using the designated at least two of the plurality of signals based on one or more of 1) a received signal power and a received signal gain as received by the antenna, 2) a transmitted power and a transmitted signal gain, or 3) location information associated with each of the plurality of transmitting devices identified by at least one of a media access control (MAC) address and an internet protocol (IP) address. Then, new coordinates are generated for the electronic device based upon the distances from the plurality of transmitting devices and recording the new coordinates as a current location of the electronic device.

Another embodiment of a method for determining a location of an electronic device using bilateration is also disclosed. The method comprises the steps of receiving a plurality of signals emitted from a plurality of transmitting devices within a vicinity of the electronic device with the antenna, determining transmitting device information that comprises manufacturer and type of transmitting device for each of the plurality of transmitting devices, and determining signal propagation curves for the transmitting devices and predicting fluctuations of the signal propagation curve with the electronic device. Then, a signal quality is determined for the plurality of signals that are received based on 1) a received signal strength indicator or 2) a received signal power and a received signal gain, and the predicted fluctuations of the signal propagation curve. Next, the predicted fluctuations of the signal propagation curve are compared with either 1) the received signal strength indicator or the received signal power and 2) the received signal gain and designating at least two of the plurality of signals with the highest signal quality for location determination.

The method generates new coordinates for the electronic device based upon the distances from the first and second transmitting devices and records the new coordinates as a current location of the electronic device.

The systems and methods described herein address how to mitigate various problems associated with local-area-network-assisted location determination (e.g., Wi-Fi assisted location determination) and produce consistently accurate and precise locations. The subject invention can produce precise location determinations for the electronic device from 10 times to 100 times a second. Further, the location determinations performed according to the subject invention are able to be accurate within a few feet, even in environments such as urban canyons. Moreover, the subject invention provides accurate location determinations even if there are only two signals available.

DETAILED DESCRIPTION

Figure 1:
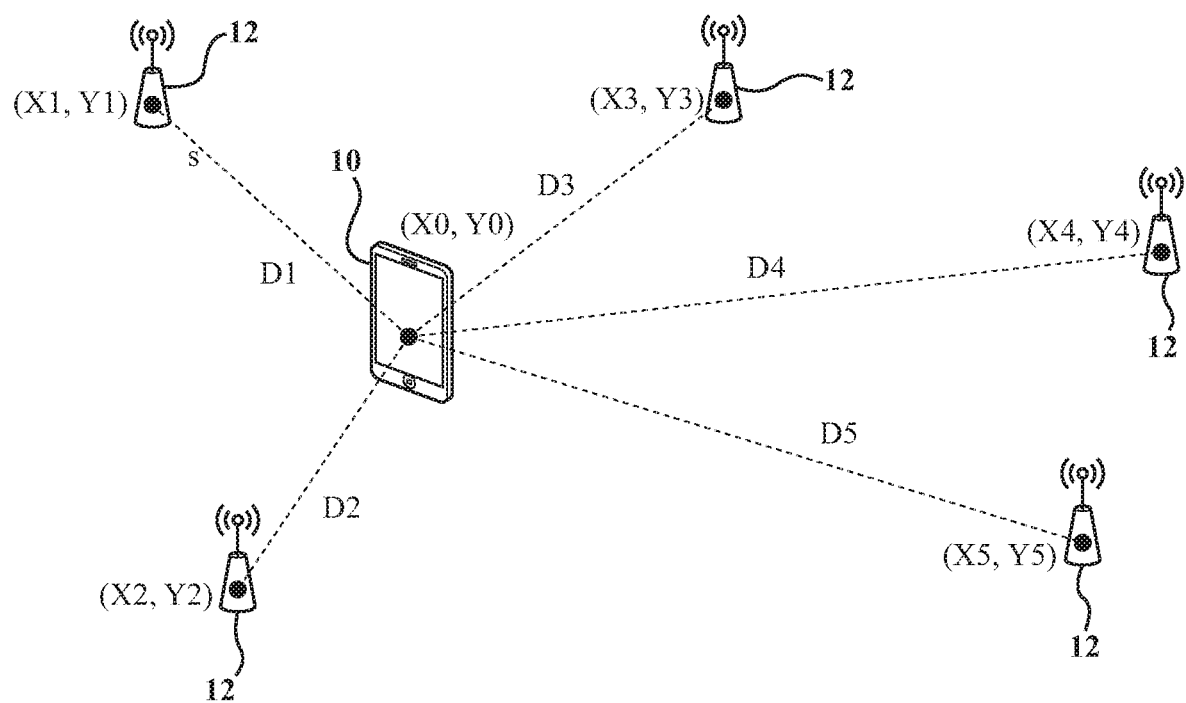
FIG. 1 depicts an electronic device spaced from transmitting devices and a location of the electronic device is determined using bilateration.

Referring to the Figures, wherein like numerals indicate like or corresponding parts or steps throughout the several views, FIG. 1 depicts an electronic device, shown generally at 10, spaced from transmitting devices, shown generally at 12, and a location of the electronic device 10 is determined using bilateration. The method is able to determine the location of the electronic device 10 via geolocation identification in mobile Heterogeneous Networks (HetNet) environments. In some embodiments, the electronic device 10 may have connectivity to a transmitting device 12. Here, "connectivity" does not necessarily require that a wireless session be initiated between the transmitting device 12 and the electronic device 10; instead, it may be sufficient that data (e.g., IP/WLAN packets) can be successfully transmitted from the electronic device 10 to the transmitting device 12, or from the transmitting device 12 to the electronic device 10. For example, if the electronic device 10 is scanning for wireless networks and is able to detect a service set identifier (SSID) associated with a wireless local-area network facilitated by the transmitting device 12, the electronic device 10 and the transmitting device 12 may be said to have connectivity to each other. In such examples, the SSID may be used to generate the transmitting device 12 connectivity notification.

Each of the components in the system according to the invention have bidirectional wireless capabilities (e.g., to support the transmission and receipt of signals using well known and standard protocols). In FIG. 1, the electronic device 10 may be sending and receiving the signals and the transmitting devices 12 may also be sending and receiving the signals. Each signal may include location information of the transmitting devices 12, as will be discussed below. In one embodiment, the electronic device 10 having the unknown location receives signals transmitted from transmitting devices 12 to determine the unknown location. In other embodiments, the electronic device 10 having the unknown location transmits one or more signals, which are received by transmitting devices 12 to determine the unknown location. Some or all of the devices may both transmit and receive to improve the accuracy of the distance measurement. This provides more data to process and the averaging that results from processing more information improves the accuracy of the distance measurement since the effect of random errors is reduced. In certain embodiments, the electronic device 10 may instruct the transmitting devices 12 within the vicinity of the electronic device 10 to transmit a signal, and the signal may include such location information. As one example, the electronic device 10 may use an Access Network Query Protocol (ANQP) for Wi-Fi Hotspot 2.0 based on the IEEE 802.11u standard. Other protocols and procedures used in Wi-Fi technology to identify wireless SSIDs may be utilized for the query without deviating from the subject invention.

Figure 2:
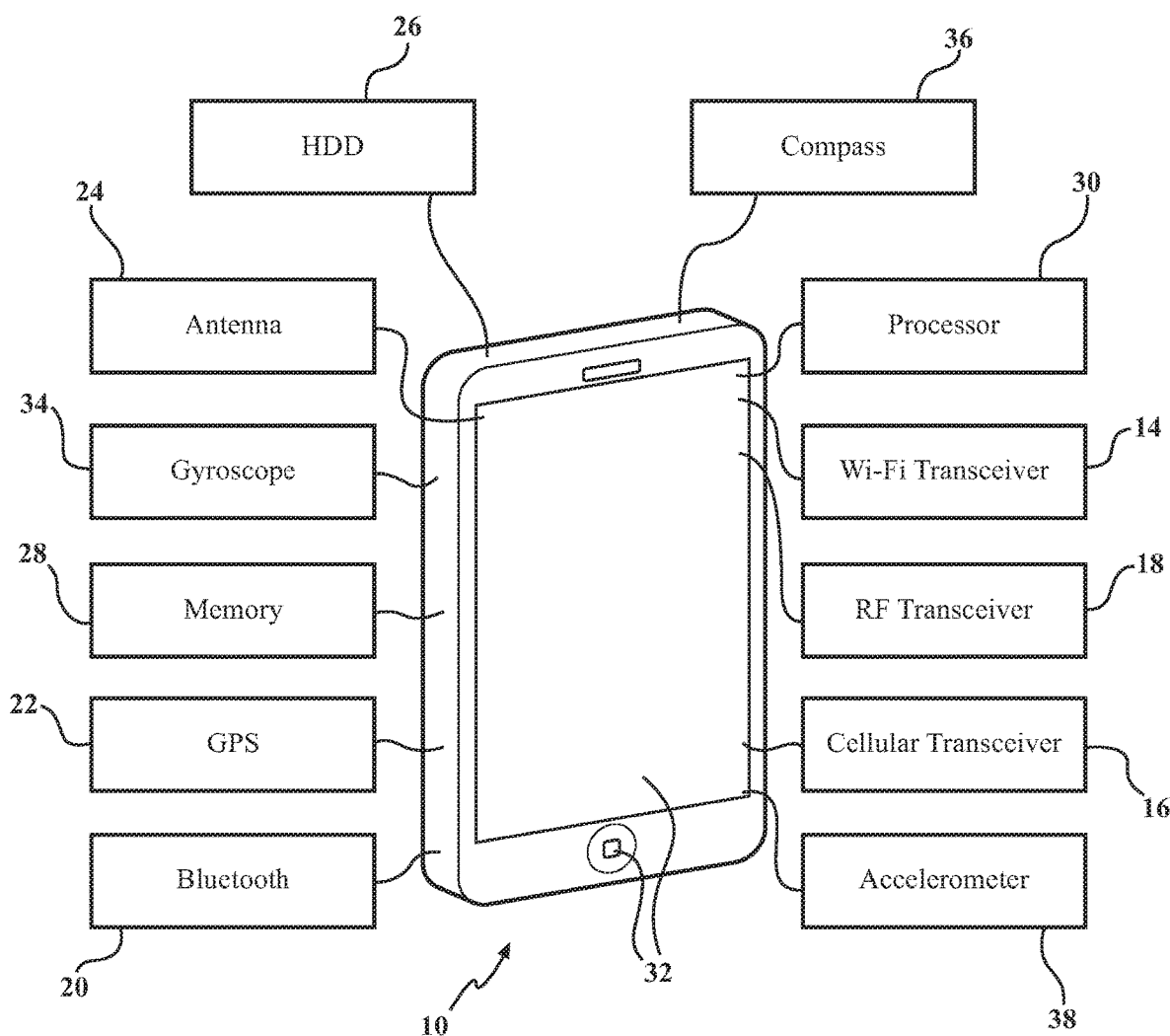
FIG. 2 is a schematic view of an electronic device.

Referring to FIG. 2, by way of example, the electronic device 10 may include one or more radio-frequency transceivers 14, cellular telephone transceivers 16, IEEE 802.11 (Wi-Fi) transceivers 18 (e.g., one or more wireless local area network transmitting devices and/or receivers), Bluetooth transceivers 20, and satellite navigation system receiver circuitry 22 (e.g., a Global Positioning System receiver or other satellite navigation system receiver). It is to be appreciated that various configurations and combinations of such circuitry may be used with the electronic device 10 according to the subject invention, while still practicing the invention.

The electronic device 10 also includes an antenna 24 connected thereto. In certain embodiments, the antenna 24 may be a tunable antenna, which may also be referred to as a reconfigurable antenna or a self-structuring antenna. The tunable antenna 24 is capable of modifying dynamically its frequency properties in a controlled and reversible manner. It is to be appreciated that multiple antennas, each for a different frequency type, could be used in place of the tunable antenna 24 without deviating from the subject invention so long the electronic device 10 is able to switch between antennas to tune for a specific signal type and frequency. One type of self-structuring antenna 24 may be obtained from Monarch Antenna, Inc. The tuning of the antenna 24 may also be performed with software.

As shown in FIG. 2, the electronic device 10 may also include control circuitry such as storage and processing circuitry. Storage and processing circuitry may include one or more different types of storage such as hard disk drive storage 26 and memory 28. The memory may be non-volatile (e.g., flash memory or other electrically-programmable-read-only memory) or volatile memory (e.g., static or dynamic random-access-memory). Processing circuitry may be used in controlling the operation of electronic device 10. The processing circuitry may be based on a processor 30 such as a microprocessor and other suitable integrated circuits. With one suitable arrangement, the storage and processing circuitry may be used to run software on the electronic device 10, such as mapping applications (e.g., navigation applications for a vehicle 40 or electronic device 10), email applications, media playback applications, operating system functions, software for capturing and processing images, software implementing functions associated with gathering and processing sensor data, software for issuing alerts and taking other actions when suitable criteria are satisfied, software that makes adjustments to display brightness and touch sensor functionality, etc. The operation of the storage and processing circuitry is well known to those of ordinary skill in the art, and the specifics details of such operation is not necessary for an understanding of the subject invention and is therefore not included.

Input-output circuitry may be used to allow data to be supplied to the electronic device 10 and to allow data to be provided from the electronic device 10 to external devices. Input-output circuitry 32 may include, by way of example and not limitation, input-output devices such as buttons, joysticks, click wheels, scrolling wheels, touch screens, other components with touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, keyboards and other equipment for gathering input from a user or other external source and/or generating output for a user.

The electronic device 10 may also include sensor circuitry, such as, but not limited to, a gyroscope 34, a compass 36, an accelerometer 38, and other sensors for gathering data for the electronic device 10.

Figure 3:
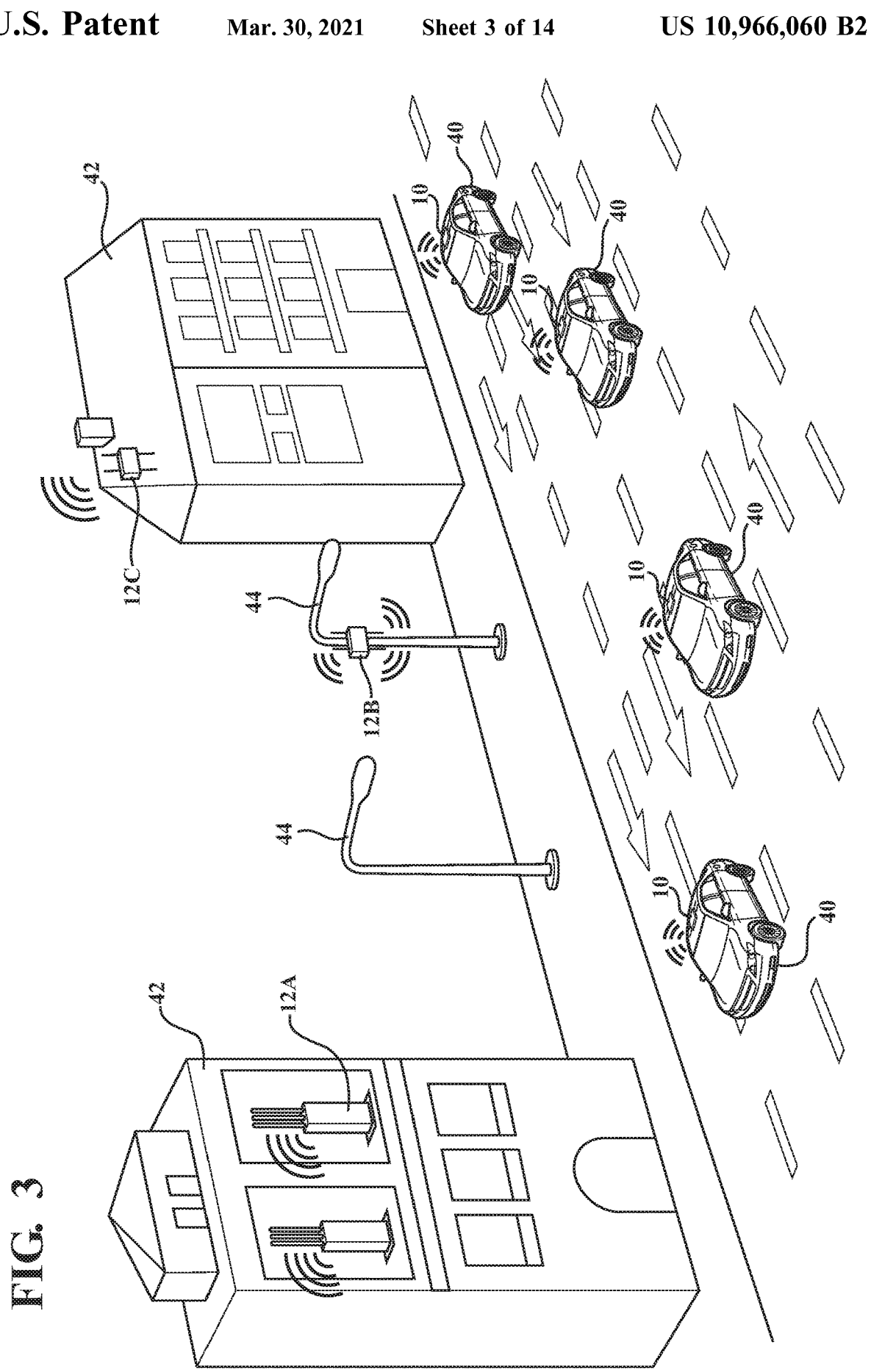
FIG. 3 is a schematic view of an environment using the subject invention having a plurality of vehicles traveling on a road through a city.

The electronic device 10 may be a cellular telephone, tablet computer or other portable computer, embedded equipment in a vehicle 40, or other mobile electronic equipment. Referring to FIG. 3, one example of an environment using the subject invention is shown having a plurality of vehicles 40 traveling on a road through a city. Each of the vehicles 40 may include a transmitting device 12 or an electronic device 10 or both. Buildings 42 are located adjacent the road and each of the building 42 may have one or more transmitting devices 12. Other structures, such as light posts 44 may be adjacent the road and may have transmitting devices 12 mounted thereto. In such an environment, the types of signals being transmitted have various, different signal types and the various objects may impact and/or interfere with the strength of such signals. The building 42 and other structures may be located adjacent to roads and create urban canyon environments. In such urban canyon environments, it may be challenging for electronic equipment, such as vehicle 40, to obtain accurate location information using only satellite navigation equipment, so according to the invention, the vehicle 40 may communicate with other transmitting devices 12 to more accurately and precisely determine location.

Figure 4:
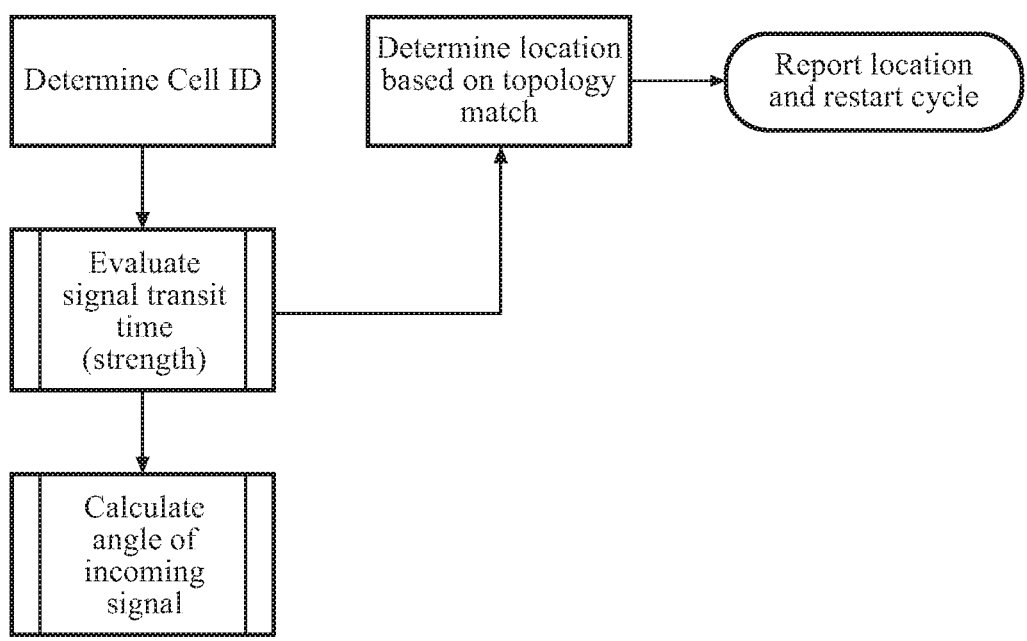
FIG. 4 is a process flow diagram showing one method of obtaining a first location from a cellular network input using time of flight and angle of incoming signal.

Referring back to FIG. 1, a plurality of transmitting devices 12 are shown in the vicinity of the electronic device 10. The electronic device 10 is at a first, or initial location that can be represented by coordinates. It is to be appreciated that the method repeats many times a second such that the initial location can also be a previous location or the most previous location from the prior cycle. The first location can be obtained from a vehicle 40 input, a GPS input, or a cellular network input or it can be determined based on trilateration of at least three or more of known Wi-Fi hotspot locations and signal strength, GPS input, or cellular network input. The first location could also be calculated from the data on the electronic device 10. Referring to FIG. 4, a process flow is shown for one method of obtaining the first location from a cellular network input using time of flight and angle of incoming signal, which are well known. The first location may be compared to a topographic map to determine the first location. The coordinate location may also be represented by at least 16 decimal places.

As shown in FIG. 1, the transmitting devices 12 are located at specific coordinates. The coordinates are represented by an X-coordinate and a Y-coordinate. It is to be appreciated that a Z-coordinate could also be included. Each of the transmitting devices 12 are a distance from the electronic device 10, which is represented by D1, D2, etc. The transmitting device 12 may be stationary transmitting device 12 attached to the interior or exterior of a building 42, mounted alongside a roadway, mounted in a traffic light or traffic sign, or otherwise installed in a stationary location. The transmitting device 12 may also be a mobile location, when incorporated into vehicles 40, trains, or the like.

The transmitting device 12 may include, but is not limited to, a computer, router, switch, hub, universal serial bus (USB) stick, roadside units 46 (RSU), or any other device capable of receiving and transmitting data (e.g., Internet Protocol (IP) packets, wireless local-area network (WLAN) packets, etc.) or any other device that transmits signals that are connected to a Wide Area Network (WAN). The transmitting devices 12 can include WLAN operating at different frequencies and using several wireless standards.

The transmitting devices 12 are transmitting signals, or messages, that are received by the electronic device 10. The type of signals that are being transmitted can vary widely, but may include Wi-Fi signals, cellular signals, Wireless Access in Vehicular Environment (WAVE) signals, and GPS signals. The Wi-Fi signals can include, but are not limited to IEEE 802.11a, b, g, n, signals. The cellular signals can include, but are not limited to global system for mobile communications (GSM), code division multiple access (CDMA), General Packet Radio Service (GPRS), 4G, 5G. Other communication protocols can also be supported, including other 802.11x communication protocols (e.g., WiMax,), Enhanced Data GSM Environment (EDGE), etc.

Figure 5:
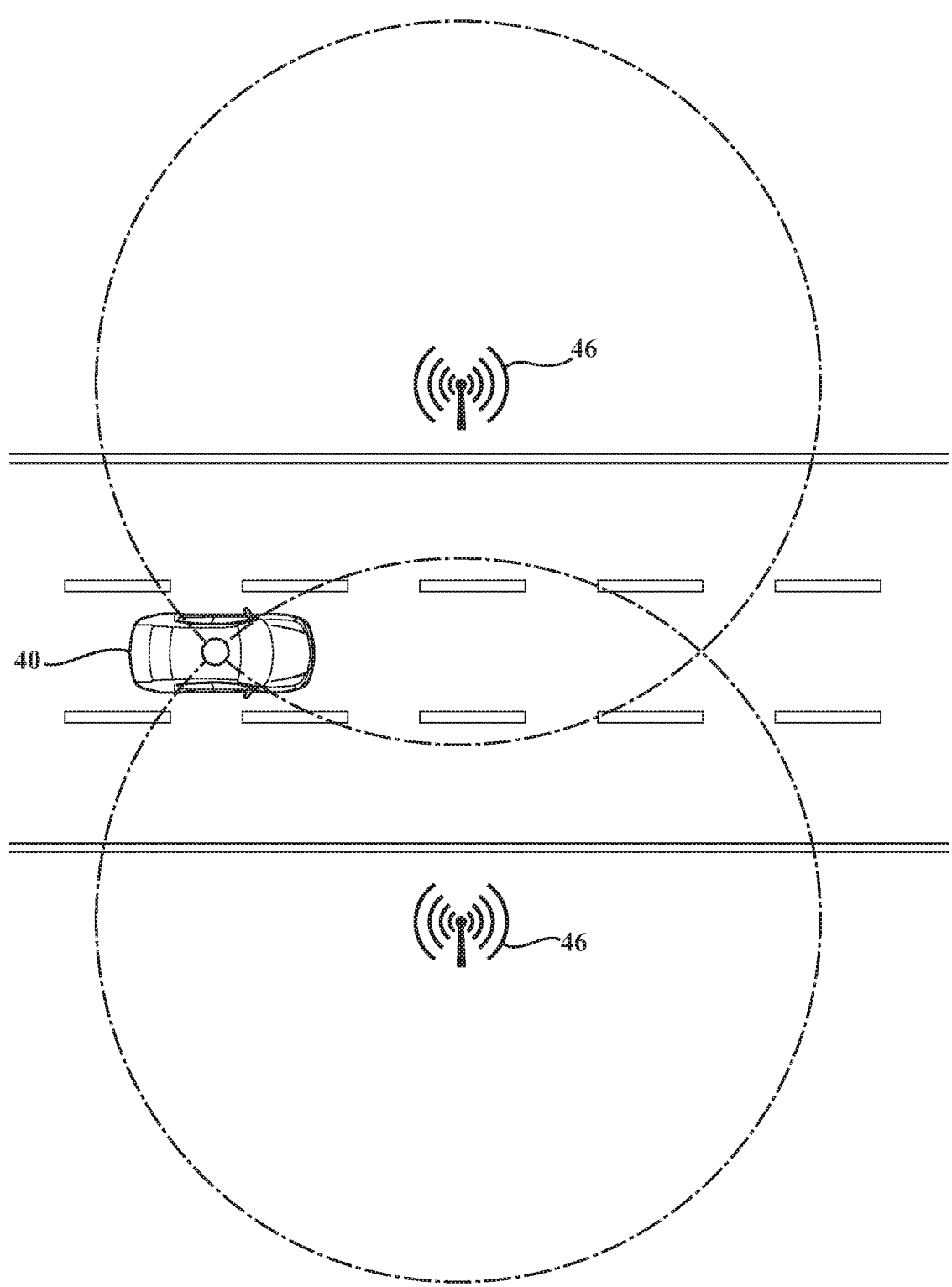
FIG. 5 is a schematic view of an environment using the subject invention having a plurality of vehicles traveling on a road.

The WAVE signal supports communication of fast running vehicles, and is configured with the Institute of Electrical and Electronics Engineers (IEEE) 802.11p and the IEEE 1609, generally in the 5.9 Ghz spectrum. The IEEE 1609.3 of the IEEE 1609 defines a network layer and a transport layer service, and the IEEE 1609.4 provides a multichannel operation. To take advantage of WAVE, the vehicle 40 has an onboard unit (OBU) and communicates with the RSU 46. RSUs 46 may be installed on both sides of the road and at various locations along the roadway. In such a system, the OBU may operate as the electronic device 10, the transmitting device 12, or both depending on the particular location or application. When vehicle to vehicle (V2V) communication is established, one OBU is the electronic device 10, while the other is the transmitting device 12 or vice versa. When vehicle 40 to infrastructure (V2I) communication is established, the OBU is the electronic device 10 and is communicating with the RSU 46 as the transmitting device 12. RSUs 46 have an established location that is precisely known. Referring to FIG. 5, two RSUs 46 are shown adjacent the road communicating with the OBU of the vehicle 40 as the electronic device 10.

For stationary transmitting devices 12, the location information may be known and transmitted as part of the signal or available from public Wi-Fi location databases, such as SkyHook Wireless, Combain Positioning Service, LocationAPI.org by Unwired Labs, Mozilla Location Service, Mylnikov GEO, Navizon, WiGLE, amongst others. The location information can include latitude, longitude, altitude, as well the transmitting device 12 model number, manufacturer name, model/device name or type, owner name, etc.

The transmitting device 12 may be able to store transmitting device location coordinates. For example, the transmitting device location coordinates may be stored in a location configuration information (LCI) format which may include, without limitation, latitude, longitude, and/or altitude information. As another example, the transmitting device location coordinates may be stored in a civic format which may include, without limitation, door number, street address, suite number, city, state, country, zip code, etc. The location coordinates may be stored locally on the electronic device 10 or stored remotely so that the electronic device 10 may access it.

In yet another embodiment, the transmitting device 12 can transmit more than once where each signal has a different center frequency and the electronic device 10 can receive and handle these different transmissions. For example, 802.11a and 802.11b use two different frequencies and if both the transmitting device 12 and electronic device 10 support 802.11a and 802.11b then using both provides better averaging. Yet another embodiment is for the transmitting device 12 to transmit more than once where each signal uses a different wireless standard, such as WLAN and UWB. The electronic device 10 supports these different wireless standards and more data is gathered and location accuracy is improved through averaging. The electronic device 10 may also receive a signal from the cellular network tower. The cell communication can include, for example, information identifying the cell tower. In some implementations, the cell communication can also include the latitude and longitude of the cell tower.

The method according to the subject invention comprises the step of obtaining a first location comprising coordinates of the electronic device 10. Referring again to FIG. 1, the electronic device 10 receives a plurality of signals emitted from transmitting devices 12 within a vicinity of the electronic device 10 with the antenna 24. Each of the transmitting devices 12 may be transmitting the same or different signal types. A signal quality is determined for a first signal transmitted from a first transmitting device 12a having a first signal type based on: 1) a received signal strength indicator (RSSI) or a received signal power and a received signal gain for the first signal, and 2) signal propagation characteristics for the first transmitting device 12a. It is to be appreciated that the electronic device 10 may simultaneously receive the plurality of signals and may simultaneously or nearly simultaneously determine the signal quality for more than one signal.

The RSSI that is received may be provided as part of the signal and represents a measurement of the power present in the received signal. The RSSI is the relative signal strength and is typically in arbitrary units, whereas power is typically measured in decibels. If the RSSI is not provided, the electronic device 10 may calculate the signal strength based on the received signal power and the received signal gain for the first signal or both. The electronic device 10 may use the storage and processing circuitry or other circuitry to determine the signal strength from the power and gain of the received first signal. Typically, when the electronic device 10 is located a certain distance from the transmitting device 12, the signal will have a certain RSSI or signal strength. The RSSI or signal strength fluctuates even though the electronic device 10 remains in the same location as a result of numerous issues. Alternatively, the received channel power indicator (RCPI) may be received.

In order to determine the signal quality, the electronic device 10 does not merely rely on RSSI or signal strength, but also uses the signal propagation characteristics associated with the first transmitting device 12a. The signal from the first transmitting device 12a may include the manufacturer of the device and the type of device or this information is retrievable based on the signal. A device database is queried based on manufacturer and type of the first transmitting device 12a to determine the actual signal propagation characteristics. The device database may be stored locally on the electronic device 10 or stored remotely so that the electronic device 10 may access it. From the device database, the signal propagation curve can be obtained and compared with the RSSI to determine whether the signal is of sufficient quality. Because the RSSI or signal strength fluctuates or wavers, the identification of the highest quality signal can be skewed. By combining the RSSI or signal strength with the signal propagation characteristics, the electronic device 10 can control how the signal is received and can predict the fluctuations, which results in a more stable detection and higher signal quality.

Next, the first signal having the highest signal quality is designated for location determination. The signals may be used for a set time period, such as 2 seconds, before scanning for other higher quality signals. The antenna 24 is tuned for the first signal type and the first signal is received with the tuned antenna 24. The first signal received with the tuned antenna 24 is used to determine a distance D1 from the first transmitting device 12a. The distance can be determined based on one or more of: a received signal power and a received signal gain for the first signal as received by the tuned antenna 24, at least one of transmitted power and transmitted signal gain of the first signal for the first transmitting device 12a, or location information associated with the first transmitting device 12a identified by at least one of a media access control (MAC) address and an internet protocol (IP) address. It is to be appreciated that the term "one or more" does not require one of each of the elements to be present. For example, the distance may be determined by only the received signal power and the received signal gain or by only the transmitted power and transmitted signal gain of the first signal for the first transmitting device 12a, if possible. Alternatively, the distance may be determined based only on the location information associated with the first transmitting device 12a. Or, the distance could be determined based on a combination of each.

The location information of the transmitting device 12 may include the SSID and the MAC address of the transmitting device 12. From the SSID or the MAC address, a signal strength for the first signal may be received at the electronic device 10 based on the first transmitting device 12a. The signal strength may be, for example, measured in Watts, Volts, dBm, dB, or like units. As discussed above, the signal strength can be RSSI or calculated from the power and gain. The accuracy of the location information may depend on the number of positions that have been entered into the database and on which databases are used.

One approach for determining the distance is determined according to the following formula:

$$d=10\hat{\ }[\log_{10}(\lambda)-(P_r-P_t-G_t-G_r)/20-\log_{10}(4\pi)];$$

where d is distance in meters; $\lambda$ is the wavelength of the signal in meters, $P_r$ is the power of the received signal in decibels, $P_t$ is the power of the transmitted signal in decibels, $G_t$ is the gain of the transmitted signal in decibels, and $G_r$ is the gain of the received signal in decibels.

Another approach to determining the distance is determined according to the following formula:

$$d = 10^{\wedge}((27.55 - (20.0 * 10^{\wedge}v) + |RSSI|)/20) + 45$$

where d is distance in meters; v is the frequency of the signal in MHz, and RSSI is received signal strength by the electronic device 10.

Next, a signal quality for a second signal is determined from a second transmitting device 12b. It is to be appreciated that the first and the second signals may be received simultaneously or near simultaneously. The subject invention may receive the signals 10 to 100 times a second and, as such, the determinations may be performed 10 times a second and up to 100 times a second. As faster data processing speeds are possible, the subject invention may process up to 1000 times a second if more accuracy is desired. The second signal may have a second signal type different than or the same as the first signal. The signal quality is based on the same factors used from the first signal, as discussed above and applied to the second signal. The second signal having the next highest signal quality is designated for location determination. In other words, the method will use the second signal with next highest signal quality.

The antenna 24 is tuned for the second signal type and the second signal is received with the tuned antenna 24. A distance is determined from the second transmitting device 12b based on one or more of: a received signal power and a received signal gain for the second signal as received by the tuned antenna 24, transmitted power and transmitted signal gain of the second signal for the second transmitting device 12b, or location information associated with the second transmitting device 12b identified by at least one of a media access control (MAC) address and an internet protocol (IP) address. Determining the distance of the electronic device 10 from the second transmitting device 12b using the tuned antenna 24 is the same as described above with respect to the first transmitting device 12a. However, it is to be appreciated that determining the distance from the first and second transmitting devices 12a, 12b may be different and may rely on different variables between the first and second signals.

Once the distances of the first and second transmitting devices 12a, 12b are known from the respective first and second signals, the relative location between the electronic device 10 and the respective first and second transmitting devices 12 is ascertained and first and second transmission circles are developed based upon the distances. Next, the points of intersection is determined where the first and second transmission circles intersect.

Figure 6A:
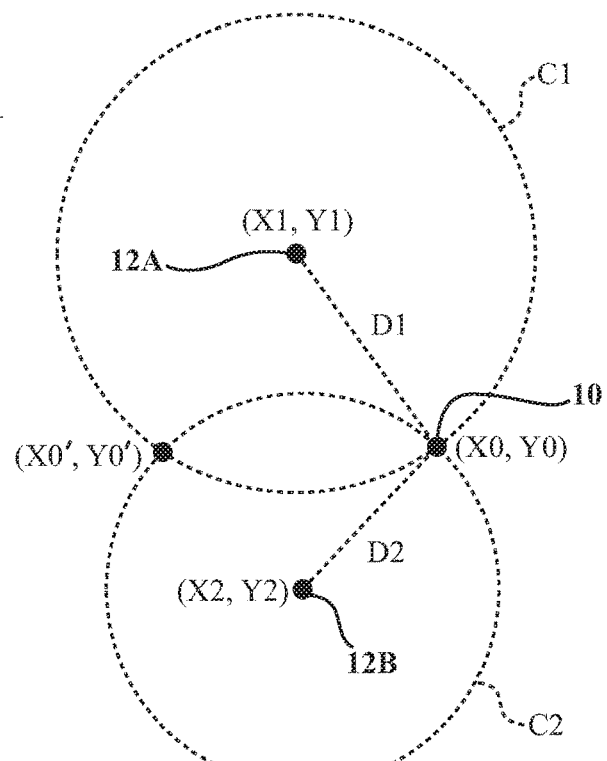
FIGS. 6A and 6B show illustrative transmission circles for transmitting devices and an electronic device is at one of the two intersections of the circles.

FIG. 6A shows illustrative transmission circles for the transmitting devices and the electronic device 10 is at one of the two intersections of the circles. The location coordinate for the electronic device 10 can be narrowed down to one of two intersection coordinates, (X0, Y0) and (X0', Y0'), which are the points of intersection of circles C1 and C2 defined by using the location coordinates (X1, Y1) and (X2, Y2) as centers of the circles C1 and C2, respectively, and device distances D1 and D2 as radii of the circles C1 and C2, respectively. The first transmitting device 12a is at location coordinates (X1, Y1) and the second transmitting device 12b is at location coordinates (X2, Y2). The electronic device 10 is a distance D1 from the first transmitting device 12a and a distance D2 from the second transmitting device 12b. In this example, each location is defined in terms of two-dimensional Cartesian coordinates (X and Y). However, it is to be understood that any spatial location coordinate system may be used with dimensionality ranging from a single dimension (e.g., (X); (θ); etc.) to three dimensions (e.g., (X, Y, Z); (R, θ, φ); etc.). The Z coordinate in the X, Y, Z coordinates may correspond to the vertical location (height) of the transmitting devices 12. Transmitting devices 12 may be positioned at each level in a multilevel roadway, the electronic device 10 may be provided with information on which level vehicle 40 is located on (either from information such as a transmitted Z location from transmitting devices 12 or transmitted roadway level information).

Figure 6B:
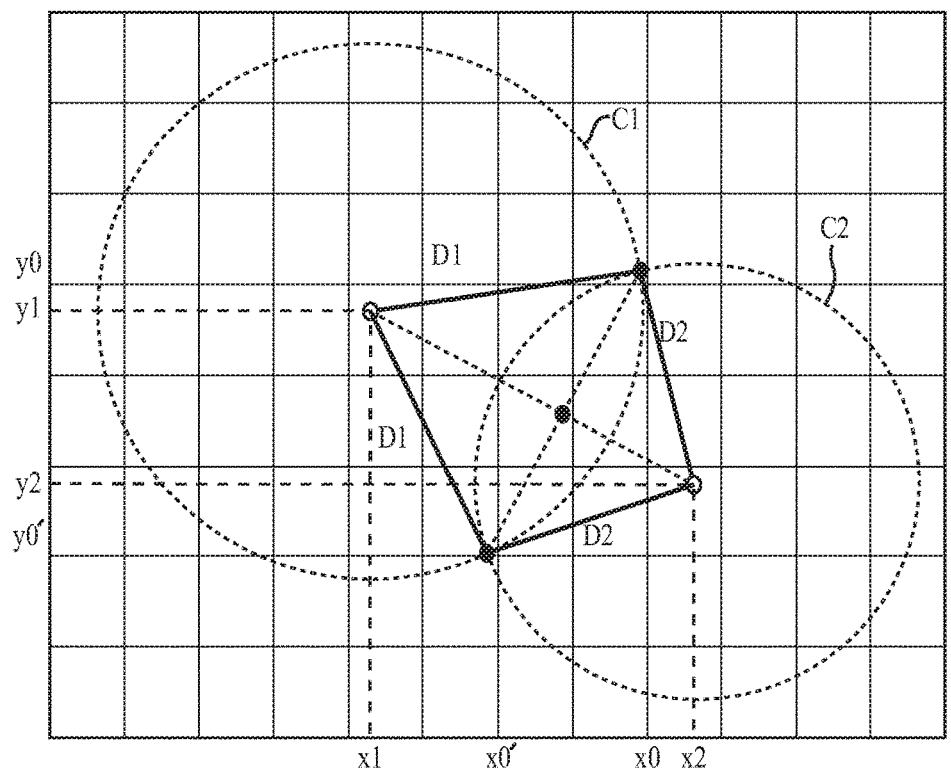

Referring to FIG. 6B, the two circles are shown on a graph with Cartesian coordinates. The distance between the centers of C1 and C2 is:

$$D_{C1-C2} = \sqrt{(X2-X1)^2 + (Y2-Y1)^2}$$

The equation for the line connecting the two intersection positions is:

$$y = \frac{X1 - X2}{Y2 - Y1} x + \frac{(D1^2 - D2^2) + (X2^2 - X1^2) + (Y2^2 - Y1^2)}{2(Y2 - Y1)}$$

Since the electronic device 10 may be located at either of the two point of intersection, the method determines which of the two points of intersection is reliable. In order to determine which intersection is reliable, the intersection coordinates are compared to the first (or previous) location coordinates to determine if the intersection coordinates are feasible. This is based on detecting movement of the electronic device 10 to a subsequent location from the first location. The movement may include velocity and direction, which are provided by at least one or more of the accelerometer 38 or the gyroscope 34. For example, if the current direction of the electronic device 10 is known, then the current direction can be compared to the intersection coordinates to determine if either are reliable and/or if one is more reliable than the other. The following equations are useful in determining the intersection coordinate distance from a previous intersection coordinate:

$$\text{Latitude Difference (in radians)} = \left(\frac{\pi}{180}\right) * (\text{Latitude 2}) - (\text{Latitude 1}); \quad 1)$$

where Latitude 2 is the latitude at the current location and Latitude 1 is the latitude at the previous location.

$$\text{Longitude Difference (in radians)} = \quad 2)$$
$$\left(\frac{\pi}{180}\right) * (\text{Longitude 1}) - (\text{Longitude 2});$$

where Longitude 2 is the longitude at the current location and Longitude 1 is the longitude at the previous location.

$$\text{Latitude 1 Radians} = \left(\frac{\pi}{180}\right) * (\text{Latitude 1}). \quad 3)$$

$$\text{Latitude 2 Radians} = \left(\frac{\pi}{180}\right) * (\text{Latitude 2}). \quad 4)$$

$$a = \sin\left(\frac{\text{Latitude Difference}}{2}\right) * \sin\left(\frac{\text{Latitude Difference}}{2}\right) + \quad 5)$$
$$\sin\left(\frac{\text{Longitude Difference}}{2}\right) * \sin\left(\frac{\text{Longitude Difference}}{2}\right) *$$
$$\cos(\text{Latitude 1 Radians}) * \cos(\text{Latitude 2 Radians}).$$

-continued $$c = 2 * \arctan\left(\frac{\sqrt{a}}{\sqrt{1-a}}\right). \quad (6)$$

$$R(\text{in km}) = 6371. \quad (7)$$

Distance from previous location=R*c.

If the velocity of the electronic device 10 is known, then the previous location and the velocity can be used to compare the intersection coordinates and determine if either are reliable and/or if one is more reliable than the other. Using the above equations provides the distance from the previous location to the current location, so that the distance can be evaluated to determine if such distance is feasible. If the distance is too great, then the current location may be disregarded. If the distance is not too great, then the current location is reliable. In determining whether the distance is feasible, the velocity of the electronic device 10 can be evaluated in combination with the previous location. One query is whether the current position is possible given the known previous location and velocity. For example, if the distance from the previous location is calculated one second later and is 500 feet away, and the electronic device 10 was traveling 55 mph (about 80 feet per second), then the current location is not reliable. However, if the distance from the previous location is calculated one second later and is 75 feet away, and the electronic device 10 was traveling 55 mph (about 80 feet per second), then the current location may be considered reliable.

The subject invention may also utilize a threshold based on a fixed velocity or speed when evaluating the distance from the previous location. For example, the previous location could be evaluated at speeds of 5 mph, 10 mph, 15 mph and at the actual speed. If the current location is reliable based on such evaluation, then it is stored and updated. The threshold could also be dependent upon the actual speed if known. For instance, if the electronic device 10 is or was moving at 55 mph, then the threshold could be measured in 5 mph intervals, such as at 45, 50, 60, 65 mph for the evaluation. Since the measurements are occurring at a very rapid pace, 10 to 100 times a second, the electronic device 10 could only change speed or velocity so much. Therefore, the threshold may have smaller intervals, such as 1 mph.

Once the intersection is determined to be reliable, the new coordinates are generated for the electronic device 10 corresponding to the reliable intersection. The new coordinates are stored in the electronic device 10 and the location of electronic device 10 is updated.

Additionally, if the first location, velocity and direction of the electronic device 10 is known, an estimated location can be calculated based on this information and a tolerance associated with the estimated location can be established. Depending on the velocity or the desired accuracy, the tolerance may be a few inches to a few feet. The estimated location can be compared to the current location to determine if the current location is within the tolerance and storing locations within the tolerance. If one of the intersection coordinates are within the tolerance, then this intersection coordinate is reliable and can be recorded as the new coordinate and current location of the electronic device 10.

In one particular application, the electronic device 10 may be in motion and, thus, the method includes the step of retrieving a current direction of the electronic device 10 and comparing the current direction to an initial direction. If the current direction and initial direction are the same, then the method is restarted. Said differently, in this example, the electronic device 10 has not moved so the method continues to monitor for motion. In order to precisely locate the electronic device 10 in a field when the electronic device 10 is moving, the current direction of the electronic device 10 is retrieved and compared to an initial direction to determine whether the current location is within specified boundaries. If the current direction is outside of the specified boundaries, the method is restarted.

In order to ensure precision and accuracy of the location, the subject invention monitors for signals having a higher signal quality than either of the first and second signals. The monitoring may be accomplished by continuously scanning for signals or scanning at predetermined time intervals. The electronic device 10 may initiate a new search for a new plurality of signals and re-measure signal quality after expiration of the predetermined time and selecting the two signals with the highest signal quality. For example, the first and second signals may be used for the predetermined amount of time before the electronic device 10 checks for a different signal having a higher signal quality. If the first and second signals remain the highest quality, then the location determination continues with these signals. The antenna 24 may also re-tune its configuration to maintain the first and second signal as the highest quality while the electronic device 10 is in motion.

If a new, third signal is detected and it is determined that the signal quality of the third signal from a third transmitting device 12c having a third signal type is of a higher quality, then the signal with the lowest signal quality is dropped and the third signal is designated for location determination. The determination of the signal quality of the third signal proceeds in the same manner as described above for the first and second signals.

Similarly to the first and second signals discussed above, once the third signal is selected, the antenna 24 is tuned for the third signal type and the third signal is received with the tuned antenna 24. The received third signal is then used to determine the distance the electronic device 10 is from the third transmitting device 12c as described above for the first and second signals, including developing a third transmission circle, determining points of intersection between the third transmission circle and the remaining one of the first and second transmission circles, and determining which of the two points of intersection is reliable. New coordinates may be generated for the electronic device 10 based upon the distances from the first and third transmitting devices 12, which are recorded as a current location of the electronic device 10.

Figure 7A:
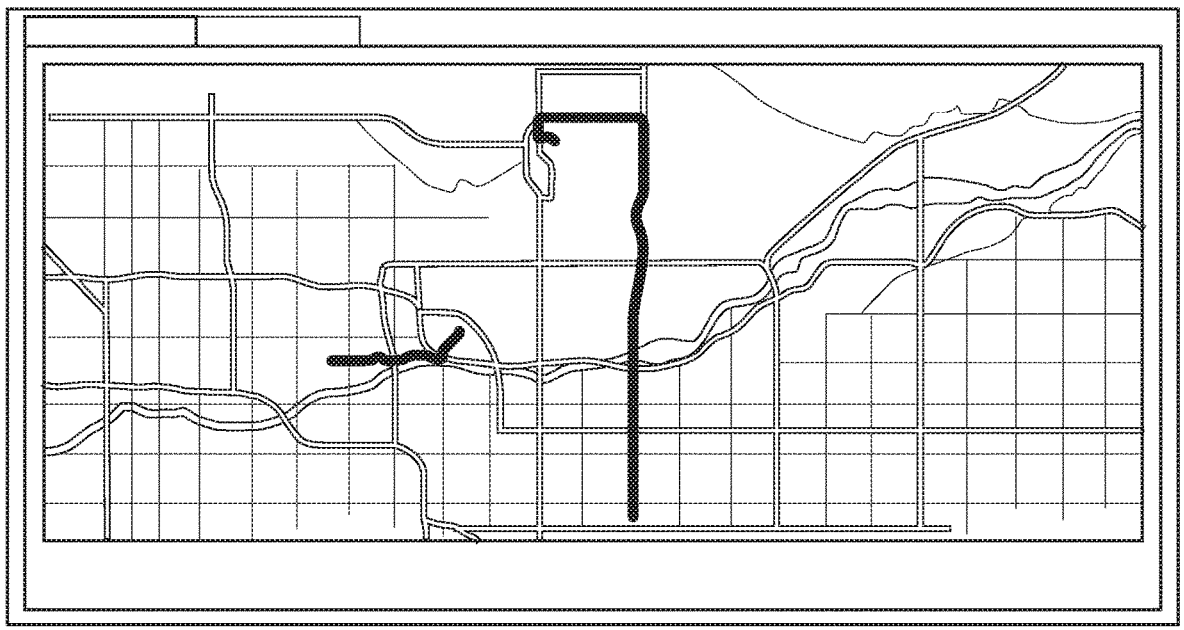
FIG. 7A-7D are graphical displays of a mapping program having the location of an electronic device plotted thereon.
Figure 7B:
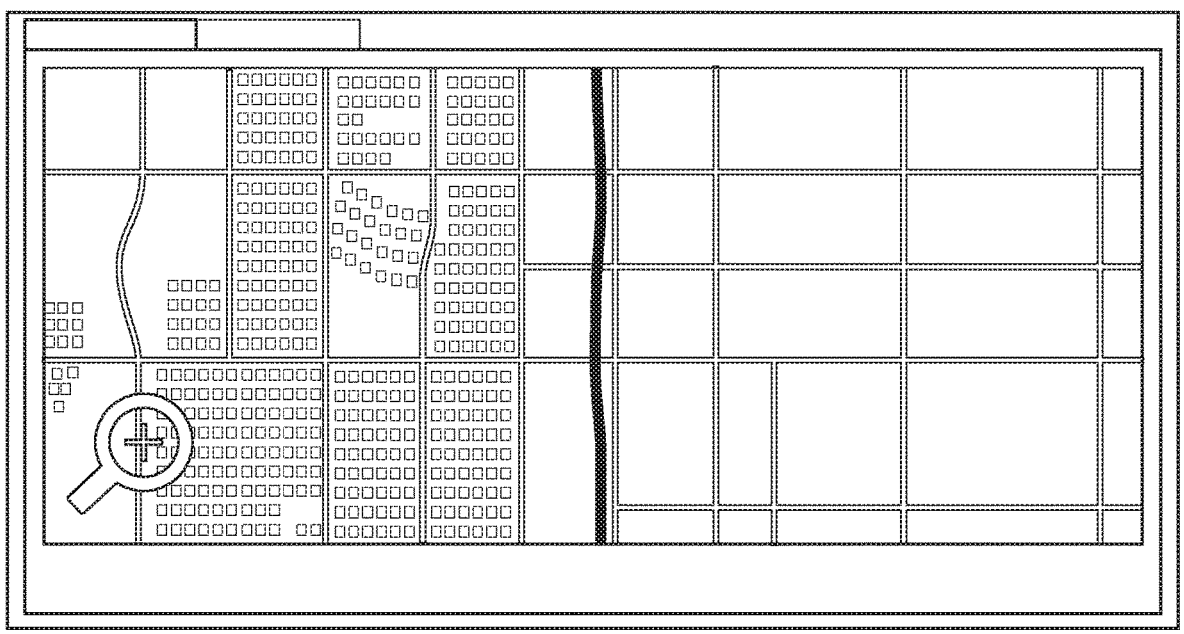
Figure 7C:
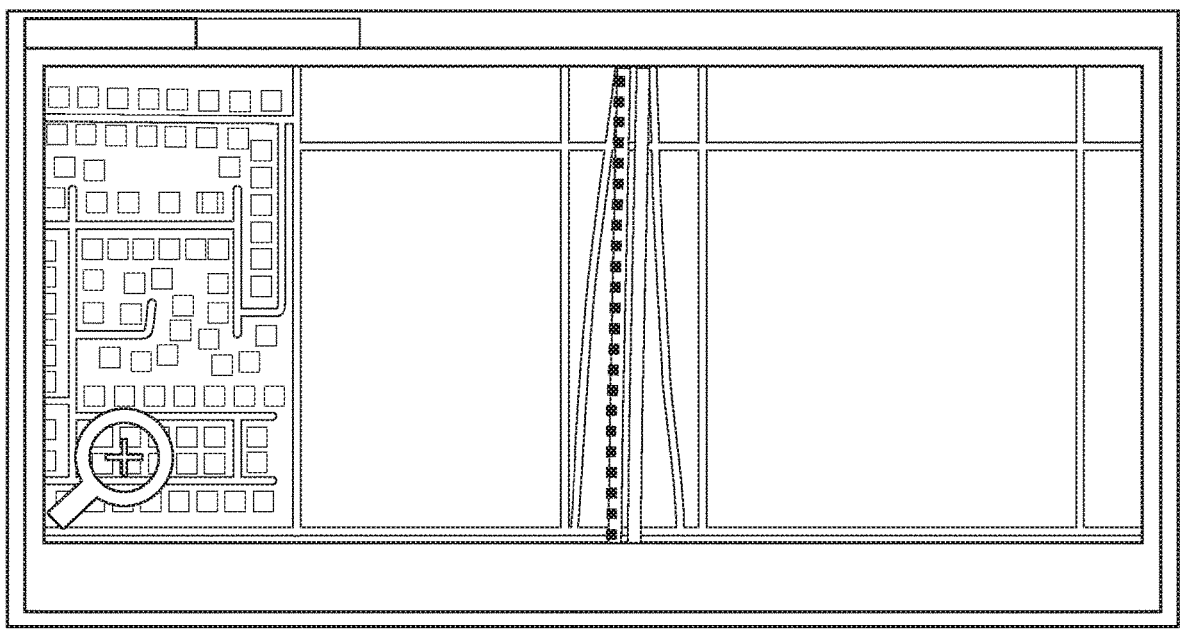
Figure 7D:
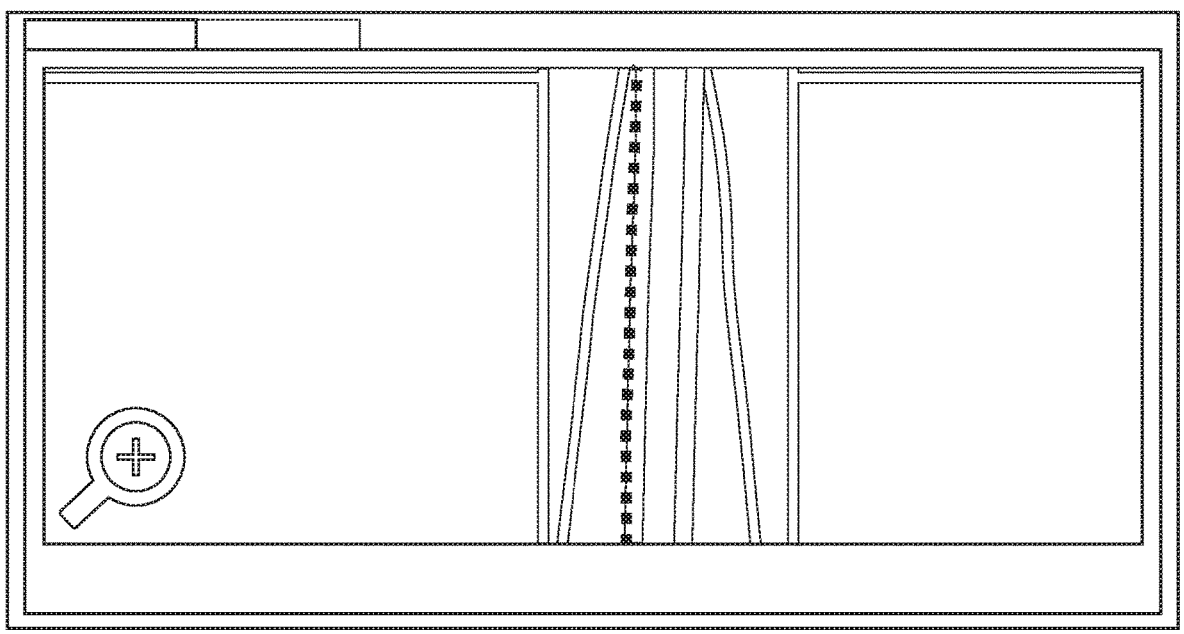

The first location and current location may also be output to a mapping program for display to a user. The map can be displayed on a display of the electronic device 10. This output may be done continuously or a set time interval. Referring to FIGS. 7A-7D, a graphical display of a mapping program is shown having the location of the electronic device 10 plotted. In FIG. 7A, the view shown is zoomed out, while FIG. 7B shows a closer view. FIG. 7C shows an even closer view where each of the locations is visible and FIG. 7D shows that the subject invention is able to detect the location with lane level accuracy. Lane level accuracy is able to distinguish the location between adjacent lanes on a roadway. The subject invention is able to determine the location within a few feet and preferably within 3 feet or less.

The electronic device 10 may also communicate with other components depending on the particular application. For example, if the subject invention is incorporated into a vehicular application, it may communicate with sensors connected to wheels, a motor for driving the wheels, brakes, lights, audio and video equipment, navigation system equipment, a steering wheel, and other components for controlling the vehicle 40, gathering input from a user (driver) of the vehicle 40, and supplying output to the user of the vehicle 40. As an example, the electronic device 10 in a vehicle 40 may ascertain its initial location using a GPS signal from the vehicle 40 or the electronic device 10, but may rely on signal strength measurements from transmitting devices 12 to accurately identify the location of vehicle 40.

Figure 8:
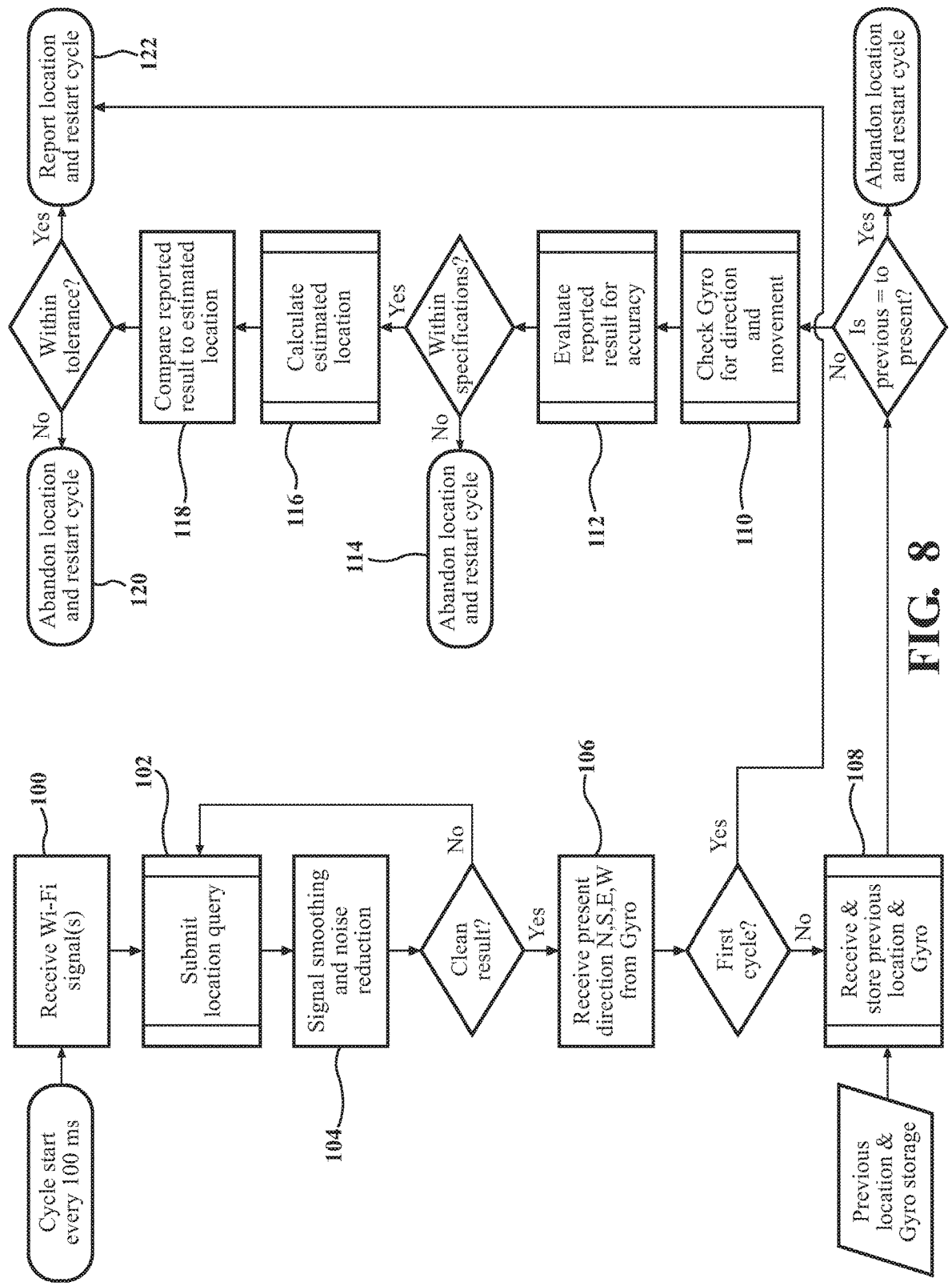
FIG. 8 is a process flow diagram showing another method to determine a location of an electronic device.

Referring to FIG. 8, an example of a method that can be performed to determine a location of the electronic device 10 is shown. The method can be performed by the processor 30 executing instructions in a computer program encoded on a tangible program carrier or stored within the electronic device 10. For example, some or all of the method can be performed in the electronic device 10. The electronic device 10 performs the method every 100 ms. In step 100, the electronic device 10 receives Wi-Fi signals from transmitting devices 12 and submits a location query to the transmitting devices 12 in step 102 to receive RSSI, power and gain, and/or device information. In step 104, the two highest quality signals received are determined and used for location determination which may include signal smoothing and noise reduction relying on the propagation characteristics of the signals.

The present direction is received from a gyroscope 34 in step 106. If this is the first cycle, then the location and direction are stored, and the cycle restarts. If this is not the first cycle, then the previous location and direction are retrieved in step 108. The previous location may be stored in the memory of the electronic device 10. If the previous location and direction are the same as the current, then the cycle is restarted. However, if they are different, then any movement and direction is retrieved from the gyroscope 34 in step 110. The retrieved movement and direction are evaluated for accuracy in step 112. The location and direction are evaluated to be within specified boundaries. Specific boundaries may be based on distance traveled, time elapsed, velocity, etc. as discussed above. If the location and direction are outside of specification, then the location is abandoned and the cycle is restarted in step 114. If it is within specification, then an estimated current location is determined in step 116 based on the previous location, velocity, and the tolerance is established. In step 118, the current location is compared to the estimated current location. If the result is outside of the tolerance, then the location is abandoned and the cycle is restarted in step 120. If the result is within the tolerance, then the location is updated and/or reported and the cycle is restarted in step 122.

Figure 9A:
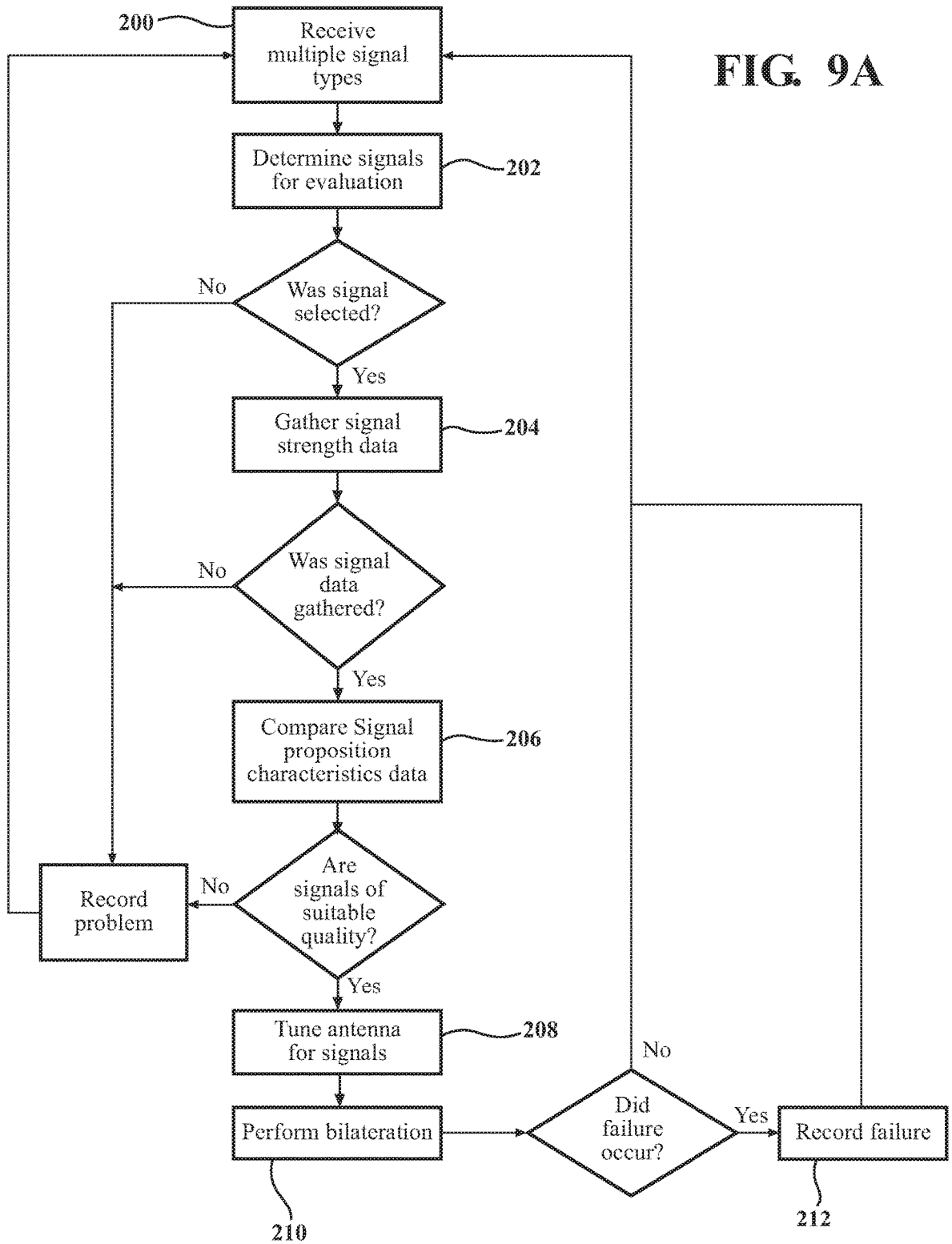
FIGS. 9A and 9B are process flow diagrams showing yet another example of a method that can be performed to determine a location of the electronic device.
Figure 9B:
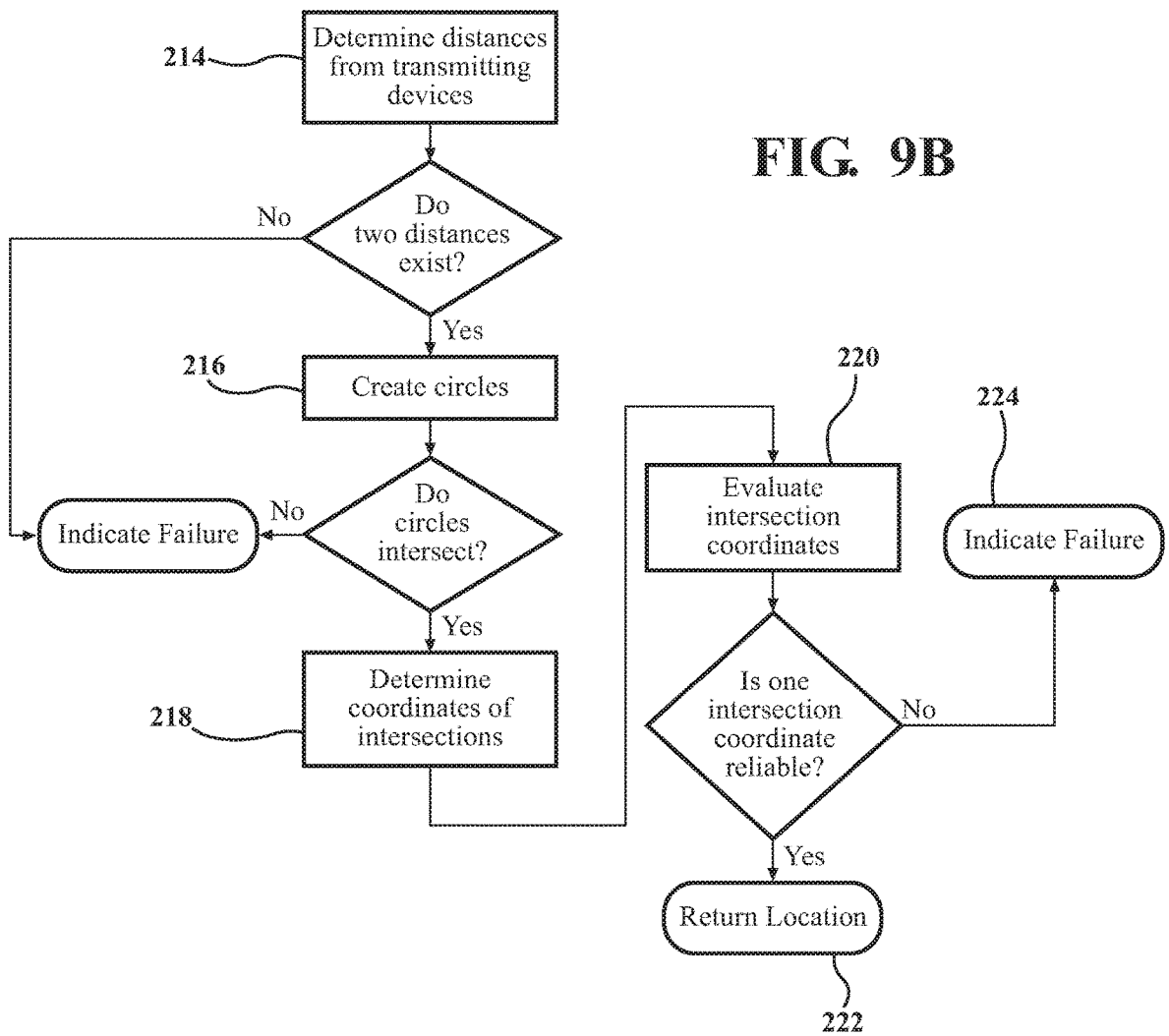

Referring to FIGS. 9A and 9B, another example of a method that can be performed to determine a location of the electronic device 10 is shown. The method can be performed by the processor 30 executing instructions in a computer program encoded on a tangible program carrier or stored within the electronic device 10. For example, some or all of the method can be performed in the electronic device 10. FIG. 9A generally discloses the steps for determining signal quality from the plurality of received signals and FIG. 9B generally discloses the steps for performing bilateration to determine the location of the electronic device 10.

In FIG. 9A, the electronic device 10 receives multiple types of signals in step 200. As discussed above, the electronic device 10 may be able to detect and receive many different types of signals. The electronic device 10 then determines two signals for evaluation in step 202. For each of the signals, in step 204, the signal strength data is gathered and signal propagation characteristics for the signals are compared to the signal strength data in step 206. If the signals are of sufficiently high signal quality, then the antenna 24 is tuned for these two signals in step 208. Next, the bilateration is performed in step in 210. If a failure occurs, then the failure is recorded in step 212.

Referring to FIG. 9B, the bilateration begins by determining the distance that the electronic device 10 is from the first and second transmitting devices 12 in step 214. As described above, the distance can be determined from the received signal power and gain and transmitted power and signal gain or location information associated with the transmitting device 12. Next, circles are created based on the distances in step 216 and the coordinates of the intersection of the circles is determined in step 218. Step 220 is the evaluation of the intersection coordinates to determine if one of the coordinates is more reliable than the other. If one intersection coordinate is more reliable, than the location of the electronic device 10 is updated in step 222. The updated location is recorded as the current location and the cycle repeats at step 202. In step 224, an indicate failure can be a rejection such that a determined location can be rejected upon determining that a difference in the determined location exceeds a threshold. For example, the electronic device 10 can reject the most recently determined location if the location is more than a maximum distance from the most recently determined location(s). In some implementations, at least part of a power information for at least one of the transmitting devices 12 can be removed upon determining that a difference in the detected power for the transmitting device 12 exceeds a threshold. For example, the electronic device 10 can remove the power information for the transmitting device if the signal power is too much stronger or weaker than the most recently obtained signal power(s).

Figure 10:
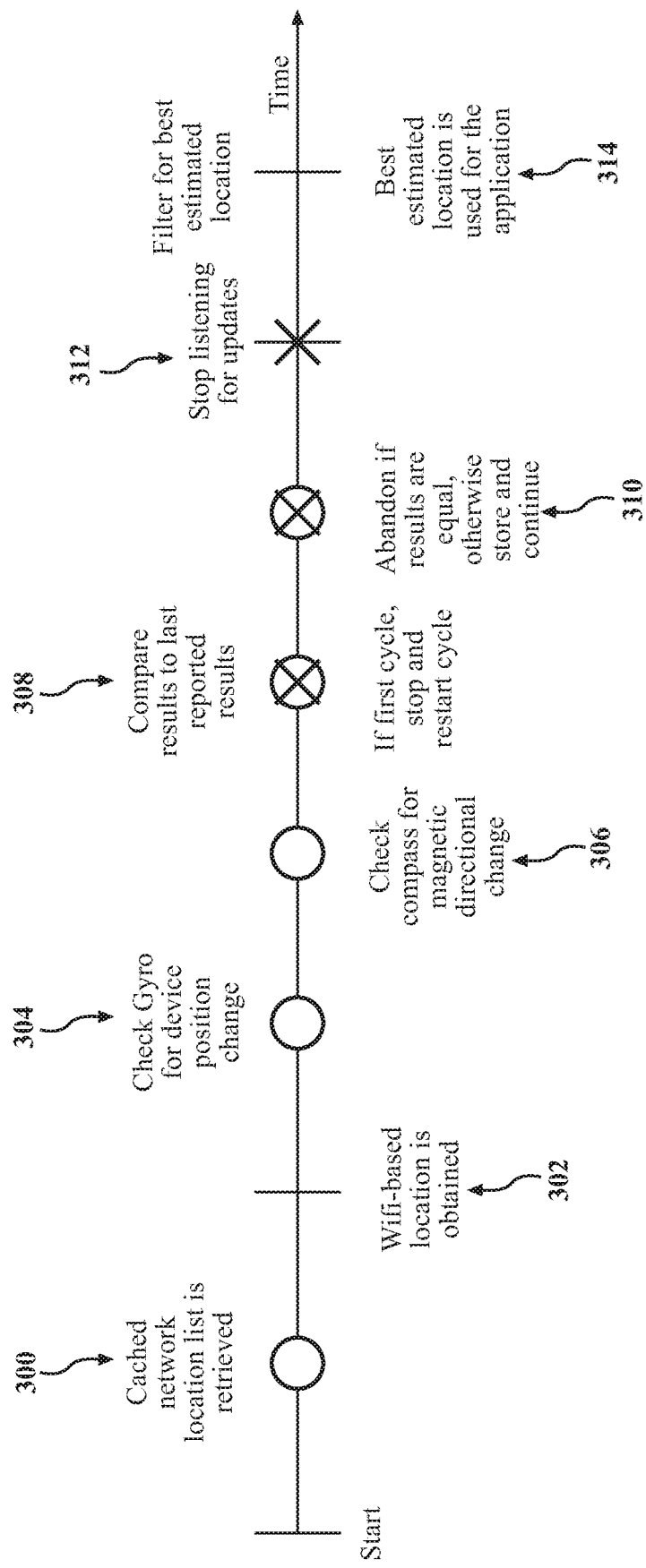
FIG. 10 is a process flow diagram for still another method than can be performed to determine a location of the electronic device.

With reference to FIG. 10, another process diagram for carrying out the subject invention is shown. When the electronic device 10 starts, it retrieves the first, or previous location in step 300. Next, in step 302, the electronic device 10 queries the surrounding transmitting devices 12 using Wi-Fi and obtains a current location using the techniques described above. In step 304, the electronic device 10 checks the gyroscope 34 for any change of position. In step 306, the electronic device 10 checks the compass 36 for any magnetic directional change. Any changes from the gyroscope 34 and compass 36 are compared to the previous locations in step 308 and evaluated to determine if an update is newer, more accurate, or more reliable. If this is the first cycle, then steps 300-308 are repeated. In step 310, if the results are equal, the process is terminated. If the results are different, they are stored. In step 312, the electronic device 10 stops listening for updates and in step 314, an estimated location is determined from the gyroscope 34, compass 36, and current location.

Figure 11:
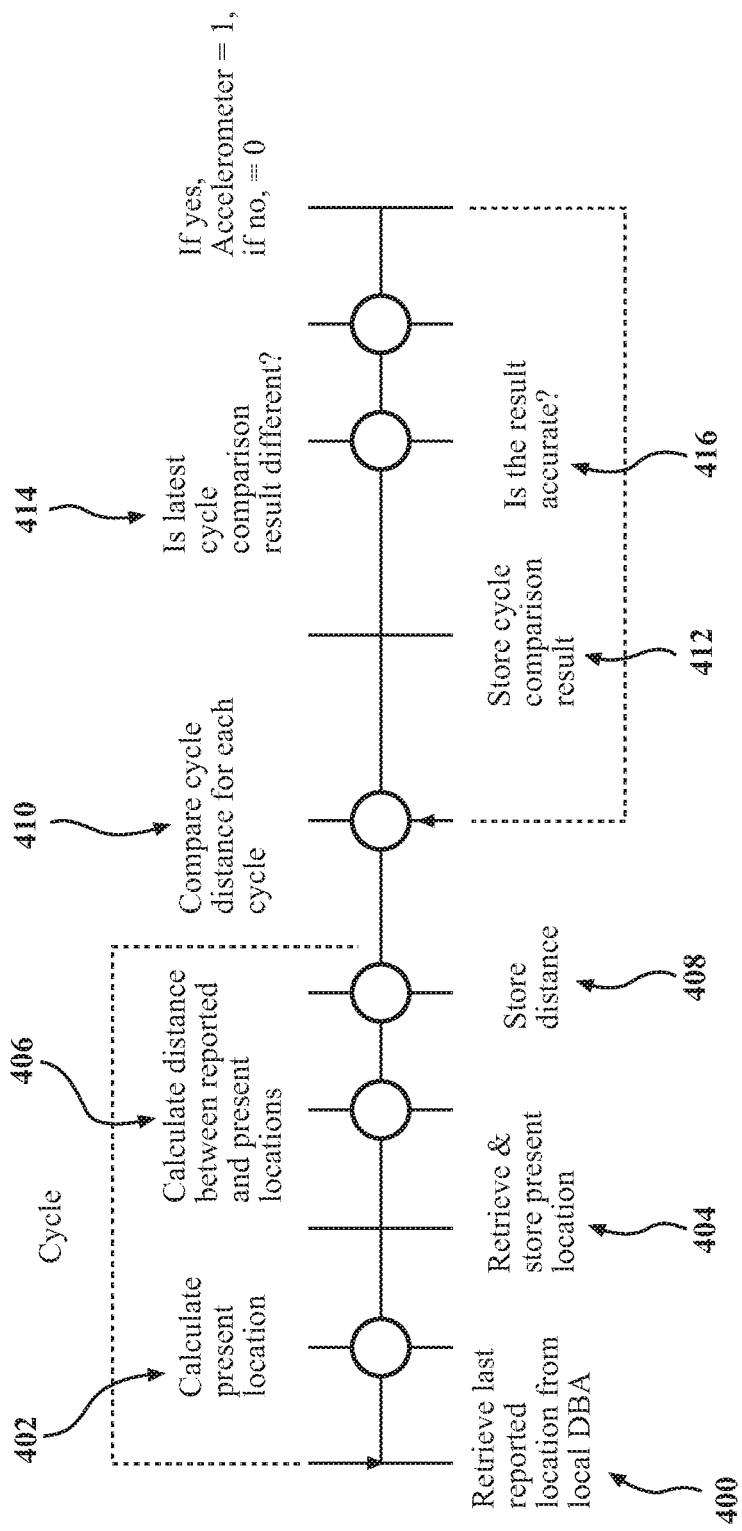
FIG. 11 is a process flow diagram for a method of determining a state of a virtual accelerometer.
Figure 12:
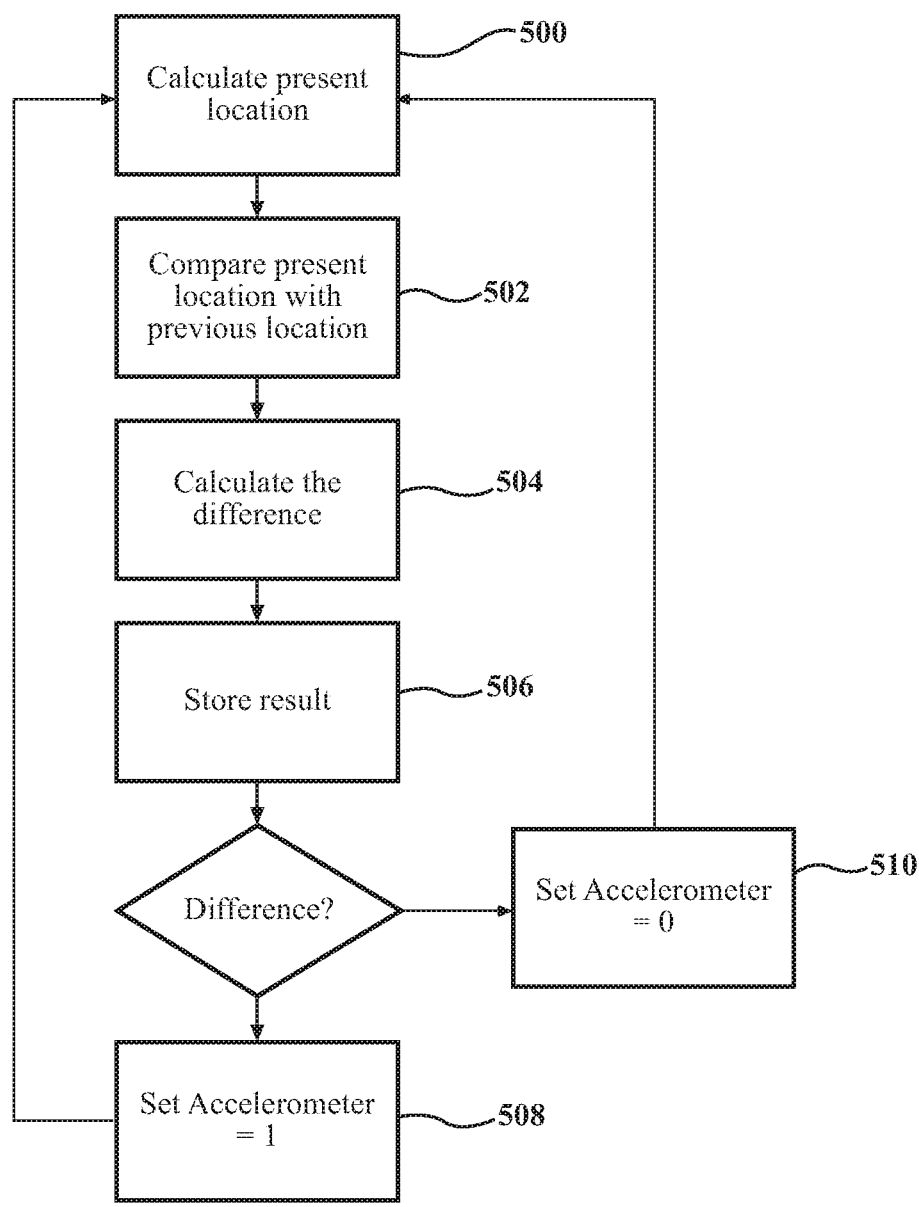
FIG. 12 is a process flow diagram for another method of determining a state of a virtual accelerometer.

FIGS. 11 and 12 represents a process where the electronic device 10 may not have a physical accelerometer 38 so that the accelerometer 38 function is performed virtually. Referring to FIG. 11, the first step is to retrieve the last reported, or previous, location of the electronic device 10 in step 400. This location may be saved in the local memory or the local database or stored remotely. The current location is calculated in step 402 using the methods described above. In step 404, the current location is retrieved and stored and in step 406, a distance between the previous location and the current location is compared. In step 408, the distance between locations is stored. Steps 400 through 408 continue to repeat at desired intervals. Next, in step 410, the distance between locations is compared for each cycle of steps 400 through 408 and saved as a cycle comparison result in step 412. In step 414, if the latest cycle comparison result is different and if it is determined accurate in step 416, then the virtual accelerometer 38 is set to 1 and if they are the same, the virtual accelerometer 38 is set to 0. In some implementations, determined location(s) can be compared to a predetermined number of locations determined previously. FIG. 11 is an alternative virtual accelerometer 38 based on changes of locations only and not based on multiple cycles as shown in FIG. 10. In step 500, the present location of the electronic device 10 is calculated as described above. The present location is compared with a previous location in step 502, and the difference is calculated in step 504, and stored in step 506. If there is a difference, then the virtual accelerometer 38 is set to 1 in step 508. If there is no difference, then the virtual accelerometer 38 is set to 0 in step 510.

Some or all steps of the method can be omitted in some implementations. In some implementations, one or more additional steps can be performed. One or more steps can be repeated, performed earlier or later, and/or performed in a different order, to name just a few examples.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more them. The term "data processing apparatus" encompasses all apparatus, devices, and machines for processing data, including by way of example a programmable processor 30, a computer, or multiple processors 30 or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output as would be understood by those of ordinary skill in this art. The processes and logic flows can also be performed by, and apparatus can also be implemented as, special purpose logic circuitry, e.g., an FPGA (field programmable gate array) or an ASIC (application-specific integrated circuit).

Processors 30 suitable for the execution of a computer program include, by way of example, both general and special purpose microprocessors, and any one or more processors of any kind of digital computer. Generally, a processor 30 will receive instructions and data from a read-only memory or a random access memory or both. The essential elements of a computer are a processor 30 for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor 30 and the memory can be supplemented by, or incorporated in, special purpose logic circuitry.

The disclosed embodiments can be implemented in a system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. It will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. A method for determining a location of an electronic device using bilateration, the electronic device having an antenna connected thereto, said method comprising the steps of:
   receiving a plurality of signals emitted from a plurality of transmitting devices within a vicinity of the electronic device with the antenna;
   determining a signal quality for the plurality of signals that are received based on:
      1) a received signal strength indicator or 2) a received signal power and a received signal gain, and
      signal propagation characteristics based on transmitting device information that comprises manufacturer and type of transmitting device for each of the plurality of transmitting devices;
   comparing the signal propagation characteristics with either 1) the received signal strength indicator or 2) the received signal power and the received signal gain and designating at least two of the plurality of signals with the highest signal quality for location determination;
   determining a distance from the transmitting devices using the designated at least two of the plurality of signals based on one or more of:
      1) a received signal power and a received signal gain as received by the antenna,
      2) a transmitted power and a transmitted signal gain, or
      3) location information associated with each of the plurality of transmitting devices identified by at least one of a media access control (MAC) address and an internet protocol (IP) address; and
   generating new coordinates for the electronic device based upon the distances from the plurality of transmitting devices and recording the new coordinates as a current location of the electronic device.

2. The method as set forth in claim 1 wherein the signal propagation characteristics is further defined as a signal propagation curve.

3. The method as set forth in claim 2 further comprising the step of predicting fluctuations of the signal propagation curve with the electronic device to achieve more stable detection and higher signal quality.

4. The method as set forth in claim 3 wherein the step of predicting the fluctuations is further defined as combining 1) the received signal strength indicator or 2) the received signal power and a received signal gain with the signal propagation curve.

5. The method as set forth in claim 1 wherein the step of generating new coordinates further comprises the steps of developing first and second transmission circles based upon the distances from first and second transmitting devices and the transmitting device information; determining points of intersection where the first and second transmission circles intersect; determining which of the two points of intersection is reliable; and generating new coordinates for the electronic device based upon the reliable intersection.

6. The method as set forth in claim 5 further comprising the step of obtaining velocity and direction inputs by the electronic device associated with movement of the electronic device from a previous location.

7. The method as set forth in claim 6 wherein the step of determining which of the two points of intersection are reliable is further defined as comparing the points of intersection with the previous location relative to the velocity and direction inputs and determine which of the points is feasible.

8. The method as set forth in claim 7 further comprising the step of determining if at least one of the two points of the intersection is feasible by comparing previous location coordinates to intersection coordinates for the two points.

9. The method as set forth in claim 8 wherein the step of determine if at least one of the two points of the intersection is feasible is further defined comparing at least one difference in latitude and longitude with either actual speed of the electronic device or velocity threshold intervals.

10. The method as set forth in claim 1 further comprising the step of calculating an estimated location based on a previous location, velocity and direction of the electronic device, and establishing a tolerance associated with the estimated location.

11. The method as set forth in claim 10 wherein the velocity and direction are provided by at least one or more of an accelerometer or a gyroscope.

12. The method as set forth in claim 10 further comprising the step of determining if the current location is within the tolerance and if one of the intersection coordinates are within the tolerance, then this intersection coordinate is deemed reliable.

13. The method as set forth in claim 1 wherein the step of generating the new coordinates occurs at least 100 times per second.

14. A method for determining a location of an electronic device using bilateration, the electronic device having an antenna connected thereto, said method comprising the steps of:
   receiving a plurality of signals emitted from a plurality of transmitting devices within a vicinity of the electronic device with the antenna;
   determining transmitting device information that comprises manufacturer and type of transmitting device for each of the plurality of transmitting devices;
   determining signal propagation curves for the transmitting devices and predicting fluctuations of the signal propagation curve with the electronic device;
   determining a signal quality for the plurality of signals that are received based on:

1) a received signal strength indicator or 2) a received signal power and a received signal gain, and the predicted fluctuations of the signal propagation curve; and comparing the predicted fluctuations of the signal propagation curve with either 1) the received signal strength indicator or 2) the received signal power and the received signal gain and designating at least two of the plurality of signals with the highest signal quality for location determination.

15. The method as set forth in claim 14 further comprising the step of determining a distance from the transmitting devices using the designated at least two of the plurality of signals based on one or more of:
1) a received signal power and a received signal gain as received by the antenna,
2) a transmitted power and a transmitted signal gain, or
3) location information associated with each of the plurality of transmitting devices identified by at least one of a media access control (MAC) address and an internet protocol (IP) address; and generating new coordinates for the electronic device based upon the distances from the plurality of transmitting devices and recording the new coordinates as a current location of the electronic device.

16. The method as set forth in claim 15 wherein the step of generating new coordinates further comprises the steps of developing first and second transmission circles based upon the distances from first and second transmitting devices and the transmitting device information; determining points of intersection where the first and second transmission circles intersect; determining which of the two points of intersection is reliable; and generating new coordinates for the electronic device based upon the reliable intersection.

17. The method as set forth in claim 16 further comprising the step of obtaining velocity and direction inputs by the electronic device associated with movement of the electronic device from a previous location.

18. The method as set forth in claim 17 wherein the step of determining which of the two points of intersection are reliable is further defined as comparing the points of intersection with the previous location relative to the velocity and direction inputs and determine which of the points is feasible.

19. The method as set forth in claim 18 further comprising the step of determining if at least one of the two points of the intersection is feasible by comparing previous location coordinates to intersection coordinates for the two points.

20. The method as set forth in claim 19 wherein the step of determine if at least one of the two points of the intersection is feasible is further defined comparing at least one difference in latitude and longitude with either actual speed of the electronic device or velocity threshold intervals.

* * * * *